United States Patent [19]
Ekwall et al.

[11] Patent Number: 5,896,285
[45] Date of Patent: Apr. 20, 1999

[54] APPARATUS FOR INTERCONNECTION IN VOLTAGE-STIFF CONVERTER DEVICES

[75] Inventors: Olle Ekwall; Henrik Spjut, both of Ludvika, Sweden

[73] Assignee: Asea Brown Boveri AB, Vasteras, Sweden

[21] Appl. No.: 08/931,355

[22] Filed: Sep. 16, 1997

[30] Foreign Application Priority Data

Mar. 24, 1997 [SE] Sweden ............................ 9701059

[51] Int. Cl.[6] .................. H02M 7/00; H02M 7/5387; H01B 7/00
[52] U.S. Cl. .................. 363/125; 363/132; 174/117 F
[58] Field of Search ............... 174/117 F; 363/125, 363/127, 131, 132

[56] References Cited

U.S. PATENT DOCUMENTS

| | | | |
|---|---|---|---|
| 4,153,752 | 5/1979 | MacKenzie, Jr. et al. | 428/379 |
| 4,314,737 | 2/1982 | Bogese et al. | 174/117 F |
| 4,782,194 | 11/1988 | Johnsen | 174/107 |
| 4,941,079 | 7/1990 | Ooi | 363/132 |
| 5,010,467 | 4/1991 | Tokiwa et al. | 363/37 |
| 5,172,310 | 12/1992 | Deam et al. | 363/144 |
| 5,401,908 | 3/1995 | Rodeghero | 174/117 F |
| 5,483,020 | 1/1996 | Hardie et al. | 174/117 F |
| 5,565,653 | 10/1996 | Rofidal et al. | 174/117 F |

FOREIGN PATENT DOCUMENTS 2 732 825 of 1996 France.

*Primary Examiner*—Robert E. Nappi
*Assistant Examiner*—Bao Q. Vu
*Attorney, Agent, or Firm*—Pollock, Vande Sande & Amernick

[57] ABSTRACT

An apparatus for interconnection in a voltage-stiff converter is provided. The converter has at least one phase leg with at least two current valves. The apparatus connects a current valve with a respective pole conductor. A cable extends between an end of the phase leg and a capacitor which defines a direct voltage. The cables attached to different poles are arranged close beside each other and are made of an insulation layer of polymer base which surrounds a conductor.

11 Claims, 3 Drawing Sheets

5,896,285

1

APPARATUS FOR INTERCONNECTION IN VOLTAGE-STIFF CONVERTER DEVICES

BACKGROUND OF THE INVENTION

The present invention relates to an apparatus in voltage-stiff converter devices which have at least one phase leg with at least two current valves, for interconnecting the current valves at one end of the phase leg through lines with two different pole conductors of different polarity at a direct voltage side of the converter device. The lines extend between the respective end of a phase leg for connection thereof to the pole conductors, and at least one capacitor defining the direct voltage of the direct voltage network.

Such voltage-stiff converter devices may be voltage-stiff inverters, DC/DC-converters, converters in SVCs or VSC-converters being used for transmitting power between a direct voltage network and an alternating voltage network. This application has recently become known as a result of the thesis "PWM and Control of Two and Three Level High Power Voltage Source Converters" by Anders Lindberg, Kungliga Tekniska Högskolan, Stockholm, 1995. That thesis discloses a plant for transmitting electric power through a direct voltage network for High Voltage Direct Current (HVDC) while utilizing such converters. However, the invention is not in any way restricted to exactly this application, although this embodiment will be discussed herein for disclosing the invention and the problems thereof.

When a voltage-stiff converter device is used, a problem arises which does not arise for current-stiff devices. This will be explained by reference to FIG. 1, which, by way of example, shows such a converter device in the form of a VSC-converter 1 having three phase legs 2, 3, 4 each having two current valves 5-10, comprising at least one semiconductor element of a turn-off type, such as an IGBT 11, and a rectifying member in the form of a diode 12 connected in anti-parallel therewith.

The phase legs are each connected to a phase 13, 14, 15 of a three phase alternating voltage network 16. The opposite end of the converter is connected to a direct voltage network 17 with a positive pole conductor 18 and a negative pole conductor 19. Thus, the converter is formed by a so-called six-pulse bridge.

If one considers, for example, phase 15 and assumes that the semiconductor element 11 associated with current valve 10 is turned on, and a current flows from the alternating voltage network through this semiconductor element to the direct voltage network, a turning off of the semiconductor element 11 of the current valve 10 will result in a first continued current from the phase 15 towards the direct voltage network, but now through the diode of the current valve 7. The commutation times are short, and result in comparatively large time differential coefficients for the current results. This makes it desirable to lower the inductance in the commutation circuit, i.e., in the phase leg and in the lines being connected to the different pole conductors of the direct voltage network and to the capacitors defining a direct voltage, to a level as low as possible to avoid unnecessarily high over voltages, thereby resulting in losses in the commutations. The present invention is directed to the problem of reducing the inductance, specifically in the lines of the commutation circuit.

In low or moderate voltages at the direct voltage side of the converter device, air isolation may be used, possibly in combination with insulating material in discs and a comparatively low inductance still may be obtained. However, the air distances between the lines connected to different pole conductors have to be sufficiently large to prevent flash-overs when the voltages are high, so that it is nearly impossible to obtain a sufficiently low inductance. A possible solution of this problem consists of using insulation of mica base of the type utilized in big generators for example, but this solution is too expensive.

SUMMARY OF THE INVENTION

The object of the present invention is to provide a device of the type defined in the introduction, which makes it possible to interconnect the current valves in question at the end of the phase leg through the lines and the pole conductors and capacitors while obtaining a low overall inductance of these lines, even at high voltages, between the pole conductors of the direct voltage side of the converter device without the result that the device becomes unacceptably costly.

The object according to the invention is obtained by designing the lines for connection to each pole conductor and the capacitor so that they comprise at least one separate high voltage cable with an insulating layer of polymer base surrounding the conductor thereof, and by arranging the cables belonging to different poles along at least parts of the extension thereof, close beside each other. By utilizing such a high voltage cable known in other applications, such as for transmitting electric power between different stations of an electric power network, it is possible to arrange cables of different poles close together without any risk of flashovers, even at comparatively high voltages. Consequently, the magnetic fields rotating in different directions which may be generated by the current in these cables counteract each other and an acceptable low inductance in this part of the commutation circuit is obtained.

According to a preferred embodiment of the invention, the cable is an extruded cable. Such a cable has the capability of good voltage capability proven in electric power transmitting situations and has turned out to be well suitable for this totally new use thereof where it is important to be able to arrange it close to other such cables with a comparatively high potential difference therebetween.

According to another preferred embodiment of the invention, each line comprises, for connection to a pole conductor, a plurality of such cables arranged substantially in parallel with each other. This makes it possible to lower the inductance further by dividing each line into a plurality of such cables, in which such cables then may be arranged in different patterns to lower the overall inductance of the lines.

According to another preferred embodiment of the invention, which constitutes a further development of the embodiment last mentioned, the cables are arranged in patterns beside each other with alternating cables for connection to the one and the other of the pole conductors. A very low inductance is thereby obtained since the magnetic fields generated by adjacent cables counteract each other.

According to another preferred embodiment of the invention, which constitutes a further development of the embodiment last mentioned, the cables are arranged beside each other in at least two superimposed layers so that the cables located directly above each other are connected to a different one of the two pole conductors. By arranging the cables in layers in this alternating way with respect to the polarity thereof, a very low total inductance of the lines may be obtained.

According to another preferred embodiment of the invention, the cables connected to different conductors are, along at least parts of the extension thereof, held tightly together by being inserted in a common channel. The utilization of such a channel is advantageous for ensuring that the cables are held tightly together and a low inductance results.

According to another preferred embodiment of the invention, the device is intended for converter devices in the form of VSC-converters, where it is particularly suitable for use.

According to another preferred embodiment of the invention, the device is designed for connection to a direct voltage network for High Voltage Direct Current (HVDC). In such a device, it is extremely important that the inductance in the commutation circuit be kept to a low level to avoid large losses in transmitting electric power in the stations in which the voltage-stiff converts are included.

Further advantages as well as advantageous features of the invention will appear from the following description and the claims.

BRIEF DESCRIPTION OF THE DRAWINGS

With reference to the appended drawings, they disclose preferred embodiments of the invention as examples.

In the drawings.

DETAILED DESCRIPTION OF PREFERRED EMBODIMENTS OF THE INVENTION

Figure 1:
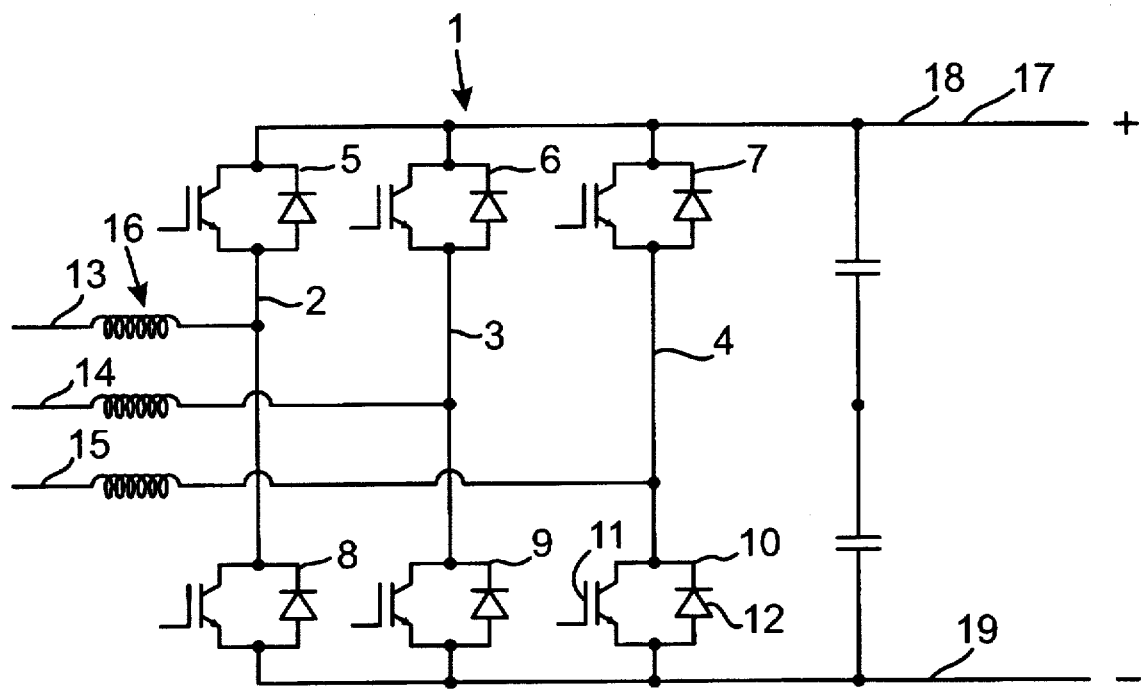
FIG. 1 is a schematic diagram illustrating the structure of a VSC-converter, to which the device according to the invention is applicable.

FIG. 1 has already been briefly discussed above. It illustrates schematically the structure of a VSC-converter connected between a direct voltage network for HVDC and a three-phase alternating voltage network. Each phase leg of the converter has two so-called current valves, comprising units of breakers 11 of turn-on and turn-off type connected in series, preferably in the form of IGBTs, and diodes 12 connected in anti-parallel therewith. A great number of such units, and thereby the IGBTs, may be connected in series in a single valve so as to be turned on and turned off simultaneously to function as one single breaker, whereby the voltage across the valve is distributed among the different breakers connected in series, and high voltages, for example, within the range of 50–300 kV, may be held by such a current valve. The control of the breakers takes place by pulse width modulation (PWM). With respect to lines 20 and 21 which connect the respective ends of the phase legs with the different pole conductors of the direct voltage network connected to the converters and with the capacitors defining the direct voltage of the direct voltage side, the inductance problems existing in such a converter have been discussed in the introduction of the description. Some of many possible preferred embodiments of the invention will now be described with reference to FIGS. 2–6.

Figure 2:
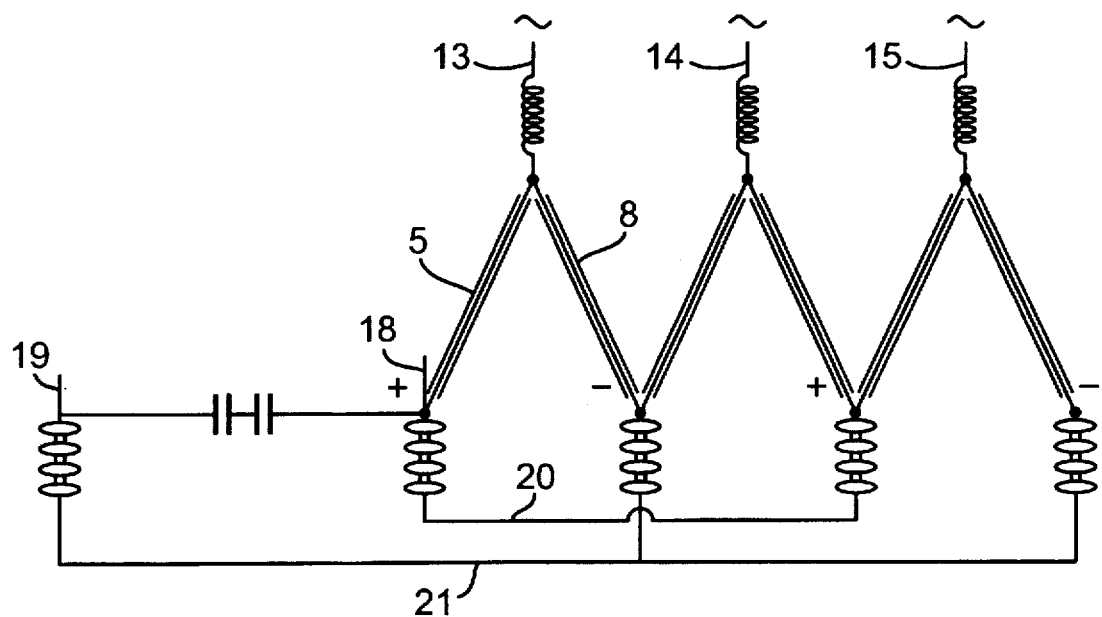
FIG. 2 is a view corresponding to FIG. 1 illustrating the structure of a device according to a preferred embodiment of the invention.
Figure 3:
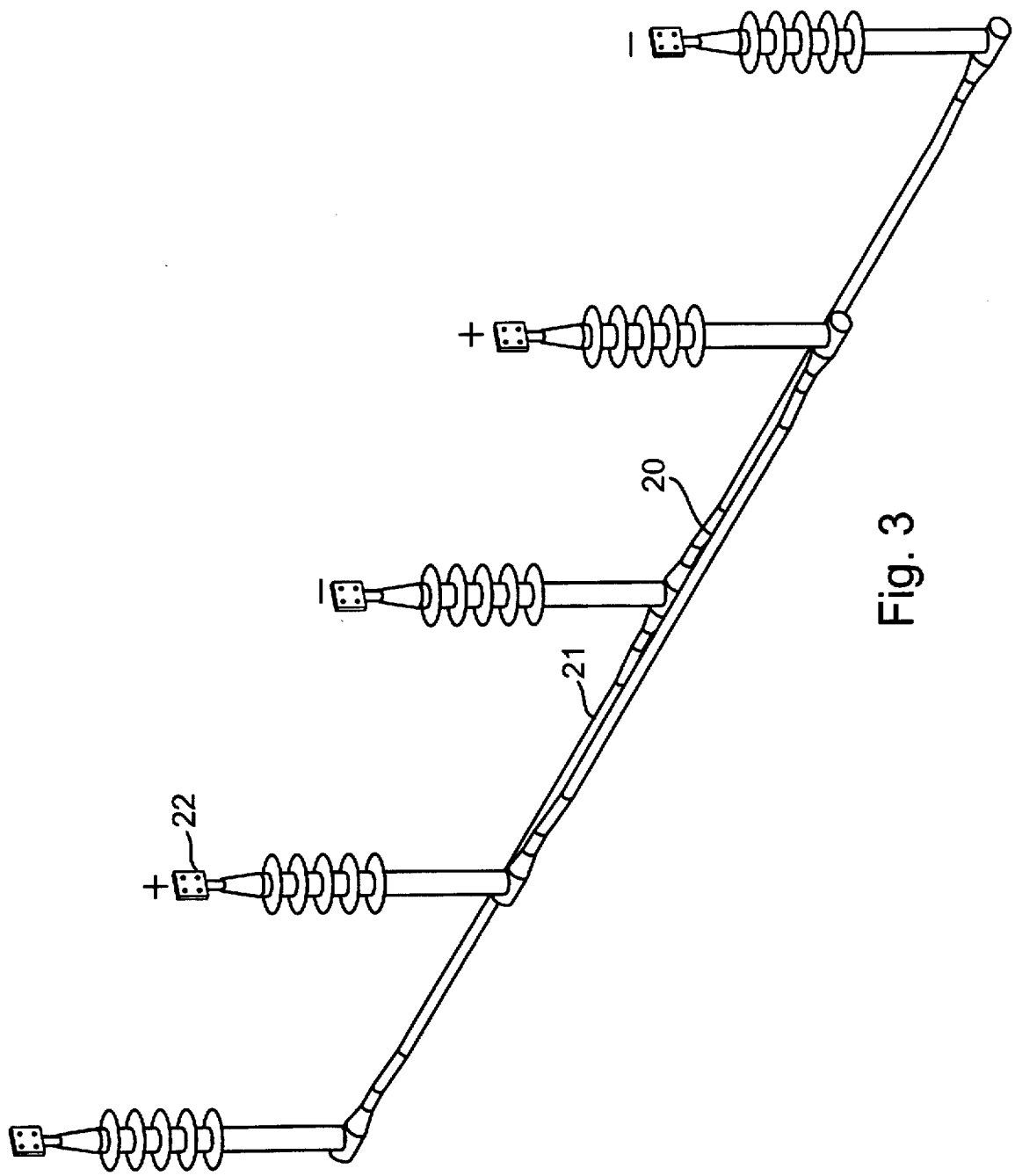
FIG. 3 is a view of the device according to the invention shown in FIG. 2 which is more detailed than that according to FIG. 2.

It is schematically illustrated in FIG. 2 how the lines 20, 21 may extend, with the lines extending over large parts substantially in parallel with and close to each other, as shown in more detail in FIG. 3. The different phase legs are omitted in FIG. 3, and only the members 22 for connection thereto are shown.

Figure 4:
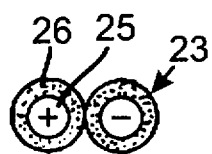
FIGS. 4–6 are schematic sectioned views illustrating different arrangements of cables in lines for connection of the ends of the phase legs of a converter to pole conductors of a direct voltage side thereof.

Each line is made of at least a high voltage cable with an insulating layer 26 of polymer base surrounding the conductor 25 thereof, such as an extruded cable; for example, a so-called PEX-cable. The simplest variant consists in utilizing only one such cable for each line 20 and 21, respectively, in which these cables are arranged close to each other for reducing the total inductance of the lines. This embodiment is illustrated in FIG. 4.

Figure 5:
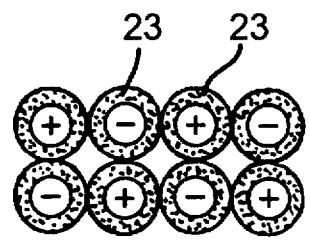

However, it is also possible that each line is made of a plurality of thin cables arranged substantially in parallel with each other, in which these cables then are, at the connection to the respective phase leg, i.e., for example, just before the connection members 22, brought together to a connection in common to the phase leg in question. A preferred embodiment, having lines consisting of a plurality of such cables, is illustrated in FIG. 5. Cables belonging to different lines have, in this embodiment, been mixed with each other along that part which they are running substantially in parallel with each other, more specifically by arranging them side-by-side in two layers with the cables located directly above each other intended for connection to a different one of the pole conductors. The inductance may be reduced to a very low level by such an arrangement.

Figure 6:
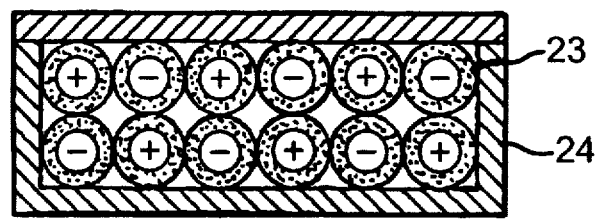

Another embodiment is illustrated in FIG. 6 which differs from that according to FIG. 5 by gathering the cables 23 in a channel 24 having walls of a material with a low electric resistivity, such as Cu or Al, which has as a consequence that the magnetic field generated around the cables when a current flows therethrough is compressed and reduced further, so that a low inductance is obtained.

The invention is, of course, not in any way restricted to the preferred embodiments described above, but many possibilities of modifications thereof will be apparent to one skilled in the art without departing from the basic idea of the invention.

It is easily understood that an amount of other combinations of the number of cables, as well as the mutual arrangement thereof for obtaining a low overall inductance of the lines, are conceivable. However, it is essential that the cables are located comparatively close to each other without any large air gaps therebetween.

The expression "two different pole conductors of different polarity" is defined to include both the cases in which one pole of the direct voltage side is formed by ground and the other pole is at negative or positive potential and the case in which the poles are on positive and negative potential, respectively.

In the case of an SVC, there is no direct voltage network connected to the lines, but nevertheless, this has a direct voltage side connected to a free capacitor.

The converter device in question may also be a DC/DC-converter, in which the number of "phases" is one, and the converter device accordingly has two direct voltage sides.

What is claimed is:

1. An apparatus for interconnection between pole connections and phase legs in a voltage stiff converter in a direct voltage network for High Voltage Direct Current, said apparatus comprising:

a voltage stiff converter having phase legs with current valves at ends of said phase legs and at least two pole connectors of a different polarity on a direct voltage side; and high voltage cables having an extension between said ends of said phase leg and at least one capacitor defining a direct voltage, said cables attached to different poles are arranged close beside each other for at least part of their extension, said cables having an insulation layer of polymer base surrounding a conductor.

2. The apparatus of claim 1 wherein said cable is an extruded cable.

3. The apparatus of claim 1 further comprising a plurality of cables arranged substantially parallel to each other.

4. The apparatus of claim 3 wherein said plurality of cables is connected to said phase leg by one common connection.

5. The apparatus of claim 3 wherein said cables are arranged beside each other with said cables alternatingly connected to one pole conductor and then the other pole conductor.

6. The apparatus of claim 5 wherein said cables are arranged in at least two layers such that the cables located directly above each other are connected to different pole conductors.

7. The apparatus of claim 1 further comprising a common channel, cables connected to different pole conductors are inserted in said common channel for at least part of their extension, whereby said cables are held tightly together.

8. The apparatus of claim 7 wherein said channel walls comprise a material having a low electric resistivity.

9. The apparatus of claim 8 wherein said material is copper.

10. The apparatus of claim 8 wherein said material is aluminum.

11. The apparatus of claim 1 wherein said converter is a VSC-converter.

* * * * *